(12) United States Patent
Kelly (10) Patent No.: US 7,478,974 B1
(45) Date of Patent: Jan. 20, 2009

(54) APPARATUS FOR HYDROELECTRIC POWER PRODUCTION EXPANSION

(76) Inventor: William Lowell Kelly, 1861 Brevor Dr., Walla Walla, WA (US) 99362

( * ) Notice: Subject to any disclaimer, the term of this patent is extended or adjusted under 35 U.S.C. 154(b) by 0 days.

(21) Appl. No.: 12/081,504

(22) Filed: Apr. 17, 2008

(51) Int. Cl.
  *E02B 9/00* (2006.01)
(52) U.S. Cl. .......................................... 405/78; 405/75
(58) Field of Classification Search .............. 405/75–78
  See application file for complete search history.

(56) References Cited

U.S. PATENT DOCUMENTS

| | | | |
|---|---|---|---|
| 194,826 A | 9/1877 | King | |
| 400,209 A | 3/1889 | Haskins | |
| 445,551 A | 2/1891 | Golden | |
| 757,909 A | 4/1904 | Gilliland | |
| 868,798 A | 10/1907 | McLaughlin | |
| 914,399 A | 3/1909 | Fancher | |
| 921,687 A | 5/1909 | Flynn | |
| 1,123,491 A | 1/1915 | Corbin | |
| 1,296,623 A | 3/1919 | Charles | |
| 1,368,042 A | 2/1921 | Miller | |
| 1,374,945 A | 4/1921 | Murray | |
| 2,753,690 A | 7/1956 | Campbell | |
| 3,097,491 A | 7/1963 | Pugh | |
| 3,807,890 A | 4/1974 | Wright | |
| 4,109,160 A | 8/1978 | Goto et al. | |
| 4,246,753 A | 1/1981 | Redmond | |
| 4,258,271 A | 3/1981 | Chappell et al. | |
| 4,272,685 A | 6/1981 | Toyama | |
| 4,317,330 A | 3/1982 | Brankovics | |
| 4,319,142 A | 3/1982 | Mayo, Jr. | |
| 4,345,159 A * | 8/1982 | Gutierrez Atencio | 405/78 |
| 4,381,645 A | 5/1983 | Galuska | |
| 4,437,017 A | 3/1984 | Osterberg | |
| 4,524,285 A | 6/1985 | Rauch | |
| 4,599,854 A | 7/1986 | Mayo, Jr. | |
| 4,674,279 A | 6/1987 | Ali et al. | |
| 4,794,544 A | 12/1988 | Albright et al. | |
| 4,816,697 A | 3/1989 | Nalbandyan et al. | |
| 4,868,408 A | 9/1989 | Hesh | |
| 4,948,985 A | 8/1990 | Adams | |
| 4,998,846 A * | 3/1991 | Evstratov et al. | 405/78 |
| 5,440,176 A | 8/1995 | Haining | |
| 5,800,077 A * | 9/1998 | March | 405/78 |
| 5,882,143 A | 3/1999 | Williams, Jr. | |
| 6,114,773 A | 9/2000 | Kouris | |
| 6,210,113 B1 | 4/2001 | Ihrenberger | |
| 6,652,221 B1 | 11/2003 | Praenkel | |
| 6,982,498 B2 | 9/2004 | Tharp | |
| 6,954,006 B2 | 10/2005 | Williams, Jr. | |

(Continued)

*Primary Examiner*—Frederick L Lagman
(74) *Attorney, Agent, or Firm*—Diller, Ramik & Wight (57) ABSTRACT

Normally hydroelectric dam powerhouses use river flow once before discharging it as turbulent tailwater, ineffective to spin turbines. The present invention uses tapered channels to confine and constrict turbulent tailwater into laminar flow that drives turbines both submersible and floatable utilizing the same water three times concurrently to generate new electricity. Channels originate adjacent to draft tube outlets, constrict in the downstream direction to create narrow necks where turbine/generators benefit from debris free, increased velocity and laminar flows to generate electricity. Hydroelectricity uses zero fuel, creates zero waste and has zero carbon dioxide emissions. Structures are uncomplicated, construction is within project boundaries minimizing environmental impacts and speeding projects coming online. New facilities are protected by existing dam security. Hydroelectricity replaces less dependable renewable energy systems.

26 Claims, 7 Drawing Sheets

U.S. PATENT DOCUMENTS

| | | |
|---|---|---|
| 6,955,049 B2 | 10/2005 | Krouse |
| 7,084,521 B1 | 8/2006 | Martin |
| 7,147,428 B2 | 12/2006 | Lamont |
| 7,262,517 B1 | 8/2007 | Srybnik et al. |
| 2005/0099012 A1 | 5/2005 | Willams, Jr. |
| 2006/0290139 A1 | 12/2006 | Takeuchi |
| 2007/0182159 A1 | 8/2007 | Davis |

\* cited by examiner

APPARATUS FOR HYDROELECTRIC POWER PRODUCTION EXPANSION

BACKGROUND OF THE INVENTION

Applicant/Inventor was a designer for twenty-two years and Value Engineering Officer (hereinafter VEO) for nine years with the Walla Walla District U.S. Army Corps of Engineers. In that period eight new hydroelectric dams were built on the Columbia, Snake, Boise and Clearwater rivers. Applicant/Inventor was involved with several of them and as VEO, he led studies on many until retiring in 1982 to continue his career in Value Engineering (hereinafter VE) as an international consultant. That included occasional VE studies on dams, such as five potential projects in Nepal and several more in the United States.

McNary Dam on the Columbia River is first Applicant/Inventor encountered with the Corps. The 1340 foot long powerhouse has fourteen generators. The total rated capacity of the powerhouse is 1,120,000 kilowatts. One hydropower turbine at McNary Dam produces as much electricity as two hundred and eleven 660 KW wind turbines. In addition, McNary's hydroelectricity is dependable, unaffected by wind, daylight or oceanic conditions.

Applicant/Inventor led a VE study on a planned second power-house for the McNary Dam. It would have duplicated the existing powerhouse by abutting and extending it on the Oregon side of the Columbia River. Complications mired the effort; it was never built and finally de-authorized. Leading the latter study embedded in Applicant/Inventor an interest to creatively increase hydroelectric dam's generation of electricity.

BRIEF SUMMARY OF THE INVENTION

Normally hydroelectric dam powerhouses use river flow once. In accordance with the present invention, the same flow is used two additional times to generate electricity without negative impact on existing generating capability plus leaves precious water in storage reservoirs, such as Lake Mead.

Water emerging from draft tubes is free of debris but roiling and churning renders it ineffective to spin turbines. In accordance with the present invention, that turbulent water is confined and constricted to both accelerate and convert it toward laminar flow useable to generate electricity. The conversion to laminar flow may evacuate water faster from the draft tube outlets thereby eliminating a rise in tailwater elevation from the new addition. In any event newly generated electricity must exceed any loss of existing output for a profitable net gain.

In accordance with the present invention tapered compartments or channels formed from one or more segments of two structural walls extend from draft tube outlets into tailwater and from river bottom to well above the maximum tailwater elevation. The compartments or channels are arranged in side-by-side relationship and each is contained on three sides but could be lidded for complete enclosure if hydraulic modeling indicates a potential benefit. Each compartment or channel converges in a direction from an upstream or uppermost origin adjacent the draft tube outlets toward a narrowest downstream channel portion which may be a simple opening or in which walls become parallel for a length (throat) then diverge to produce a venturi effect of accelerating laminar flow to drive one or more turbine/generators of submerged or floatable types located partially to fully inside the throat. Whenever possible flow should be further laminated and accelerated by frusto-conical flow acceleration tubes each surrounding each turbine/generator unit.

The turbine/generator units include both submerged and floatable types, are distinctive and comparatively selected by performance factors matched to hydropower and afterbay conditions of the particular dam whose hydroelectric power production is expanded by the present invention. Sound support structures are tailored for each turbine/generator unit including appropriate fish protection. A structure and its supported unit become one when various combinations of turbine/generator types plus vertical and horizontal locations of both submerged and floatable units are judged for the most effective combination and arrangement of units to maximize electricity production at lowest life-cycle costs. Coupling submersible and floatable turbine/generator units is one cornerstone of the invention. Most effective utilization of laminar flow distributed between submerged and floatable turbine/generator units depends upon depth of tailwater; efficiency of channel design and construction in creating/maintaining laminar flow; type, size, shape and placement of submerged turbine/generator units whose impact on upper laminar flow utilized by floatable generator/turbine units can vary from minor to major. Shallow tailwater tightens and deep tailwater expands leeway in the design process of selection, placement and relationship of turbine/generator units. The submerged turbine/generator units are located as far below the maximum tailwater elevation as practical to utilize lowermost laminar flow because the invention couples the latter turbine/generator units with barge-mounted electricity generating units that utilize uppermost surface laminar flow. The barge-mounted electricity generating units are, for example, undershot water wheels which are driven by the water's kinetic energy just immediately downstream of the submerged turbine/generator units which themselves disturb the lower laminar flow, yet with little disturbance caused thereby to the upper surface laminar flow under relatively high tailwater depth conditions.

In this manner the once unsuitable turbulent water emerging from draft tubes is converted into laminar flow that drives both submerged and floatable electricity generating units to create maximum electricity generation under project specific flow rates by minimizing impacts of submerged turbine/generator units on performance of floatable turbine/generator units.

The barge supported electricity generating units are aligned with a centerline of each of the channels, and the barges extend the entire length of the powerhouse, as do the compartments or channels and the turbine/generator units associated therewith. The barges are preferably moored to downstream pilings which in part define each of the channels or compartments, and each barge individually can be moved immediately adjacent the channel outlets to access optimum hydraulic surface flow conditions. Each barge may be positioned as need be at the channel outlets such as not to hinder access to the lowermost submerged turbine/generator units inside each converging channel/compartment.

Unlike isolated and scattered wind, tide, wave and other renewable energy systems at risk for sabotage or vandalism, the present invention lies within the protected cordoned-off area in the tailwater limiting access to project personnel. It abuts the powerhouse and is covered by its in-place security system. The invention uses no fuel, creates no waste and sends no carbon dioxide into the atmosphere. Construction occurs within project boundaries, is uncomplicated and has limited environmental impact. Its environmental assessment should be very focused and satisfied faster than usual.

Construction mostly occurs in relative shallow water; requires limited excavation; channel/compartment components are few; supports, beams and associated steel or concrete members are either readily available or can be prefabricated on site; or in concrete casting facilities in the region readily moved by truck, rail or barge; and channel/compartments can be assembled concurrently working from readily-relocated solid platforms, such as drill barges with spuds. The invention thereby lends itself to rapid construction that substantially and quickly boosts renewable electricity production at existing hydroelectric dams.

With the above and other objects in view that will hereinafter appear, the nature of the invention will be more clearly understood by reference to the following several views illustrated in the accompanying drawings, the detailed description and the appended claims.

DETAILED DESCRIPTION OF THE INVENTION

A conventional hydroelectric dam 10 (FIG. 1) generates electricity through the utilization of water head of its reservoir R. The hydroelectric dam 10 and its associated powerhouse 15 contain from one to several bays per turbine 13. Each bay contains the following elements in various numbers and configurations: trash rack 11, fish screen (not shown), gated intake 12, and penstock 14, which together control and transfer water flow through the turbine 13 to generate torque that transfers to a generator 16 whose electricity is transmitted by power lines 17 to a power system 18 and from the latter via power lines 20 to sources of utilization. Many dams use multiple intakes 12 and draft tube outlets 21 for each turbine 13 which pass water emerging from the draft tube outlets 21 which is free of debris but its roiling and churning condition renders it unsuitable as a turbine driving power source. Therefore, one the major challenge to utilize tailrace water exiting draft tube outlets 21 to drive turbines of hydroelectric dams is that of converting the turbulent tailwater flow exiting from draft tube outlets 21 into laminar flow.

Another substantial problem associated with utilizing existing hydroelectric dam sites for creating or extracting new electric energy are special interest efforts whose foremost "weapon" against run-of-the-river hydroelectric projects being the presence of anadromous fish (live in salt water and spawn in fresh water, such as Pacific and Atlantic salmon, shortnose sturgeon and American shad) and/or catadromous fish (live in freshwater and spawn in saltwater, such as eel). Water that exits a conventional powerhouse, such as powerhouse 15, has been sieved by trashracks 11, fish screens plus massive efforts to bypass or rebuild turbines to minimize fish injuries plus removable spillway weirs and reduction of nitrogen super-saturation at spillways. Thus, any utilization of existing hydroelectric dams must protect migratory fish that miss bypassing.

Adult salmon migrating upstream to spawn intuitively avoid swimming into strong currents and follow paths of least resistance. At a dam they seek passageways to fish ladders or similar features, but water exiting draft tubes is churning, eddying and up-boiling without well-defined paths for migrating fish. Fish can mill about wasting precious energy for several days seeking an entry to ladders or similar features. Laminar flow may accelerate fish passage.

Smolt traveling downstream have several aids in their journey to either bypass or mitigate impacts of going through turbines. However, smolt moving downstream that enter and survive large turbines 13 having flow velocities up to mid-double digits per second near the turbines will exit the draft tube outlets 21 at relatively slow flow of approximately 6-8 ft. (1.83-2.44 m) per second which, coupled with the use of new small slow revolving turbines with fish screens, are much less likely to injure fish.

In keeping with the foregoing the invention provides in combination three cooperative and interactive mechanisms, namely, means 30 (FIGS. 1-3) for converting turbulent tailwater flow exiting the draft tube outlets 21 into laminar flow, first means 50 for generating electricity from the bottommost laminar flow adjacent river bottom and second means 70 downstream from the first generating means 50 for generating additional electricity from uppermost laminar flow.

Figure 2:
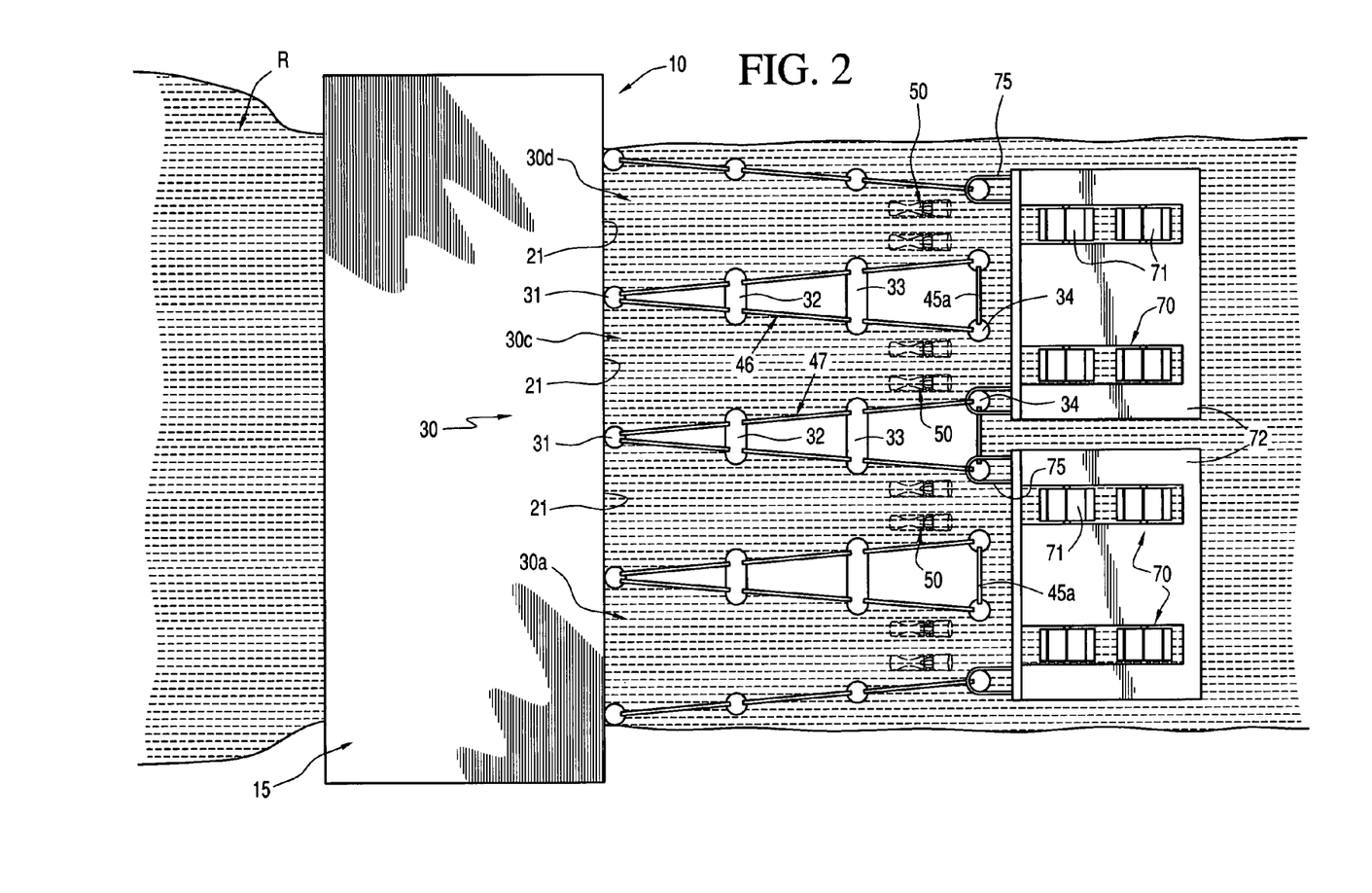
FIG. 2 is a fragmentary top plan view of FIG. 1, and illustrates four converging compartments/channels, two submerged turbine/generator units within downstream outlets of each channel and two floating barges each carrying electricity generating units utilizing undershot water wheels aligned with the converging channels outlets to generate electricity utilizing uppermost surface flow.

The means 30 for converting turbulent tailwater flow exiting the draft tube outlets 21 into laminar flow include a plurality of channels or compartments 30a through 30d (FIGS. 2 and 3) each of which converges in a flow direction toward the first electricity generating means 50 and toward the second electricity generating means 70. The following description of the channel or compartment 30c applies to the channels 30a, 30b, 30d and all other similarly constructed channels located along the length of the powerhouse 15 (FIG. 2).

Figure 3:
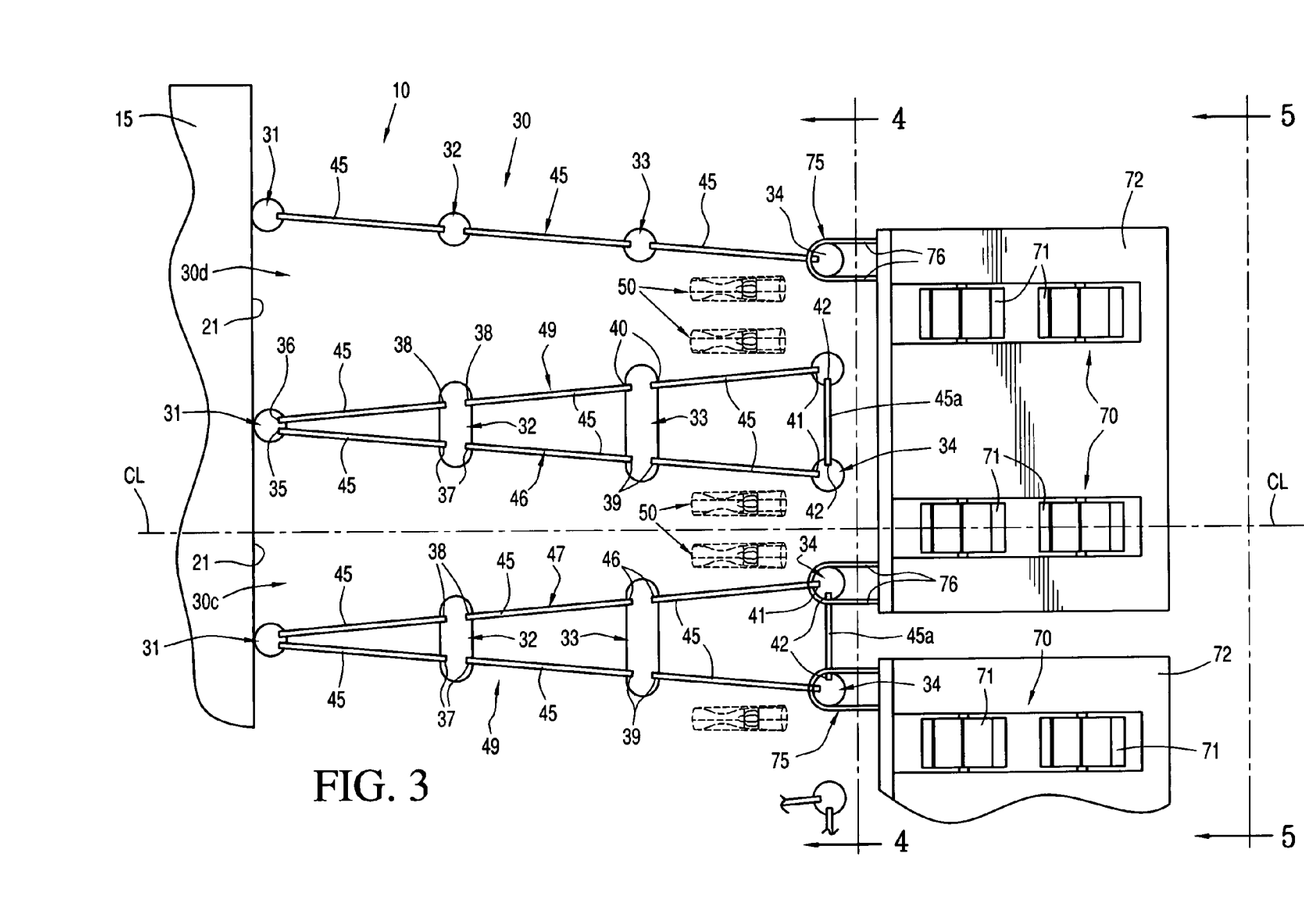
FIG. 3 is a fragmentary top plan view similar to FIG. 2, and illustrates enlarged details of supports, posts or pillars having vertical slots into which panels can be lowered to construct adjacent converging compartments/channels.

The channel 30c is formed by four pairs of supports, posts, columns 31, 31; 32, 32; 33, 33 and 34, 34 (FIG. 3). The upstream or uppermost pair of vertical supports 31, 31 are spaced furthest from each other and the downstream outlet pair of vertical supports 34, 34 are located closest to each other. The pair of vertical supports 31, 31 include two vertical slots 35, 36 (FIG. 3). The next downstream pair of vertical supports 32, 32 each include two pair of oppositely directed slots 37, 37 and 38, 38. The next downstream pair of vertical supports 33, 33 each include oppositely directed pairs of vertical slots 39, 39 and 40, 40. The downstream-most pairs of vertical supports 34, 34 each include vertical slots 41, 42 with the vertical slots 42, 42 being in opposing relationship to each other. The vertical slots 35, 37; 37, 39 and 39, 41 of the vertical supports 31, 32, 33 and 34 are in alignment with each other as are the vertical slots 36, 38; 38, 40; and 40, 41 of the respective vertical supports 31, 32, 33 and 34.

Figure 4:
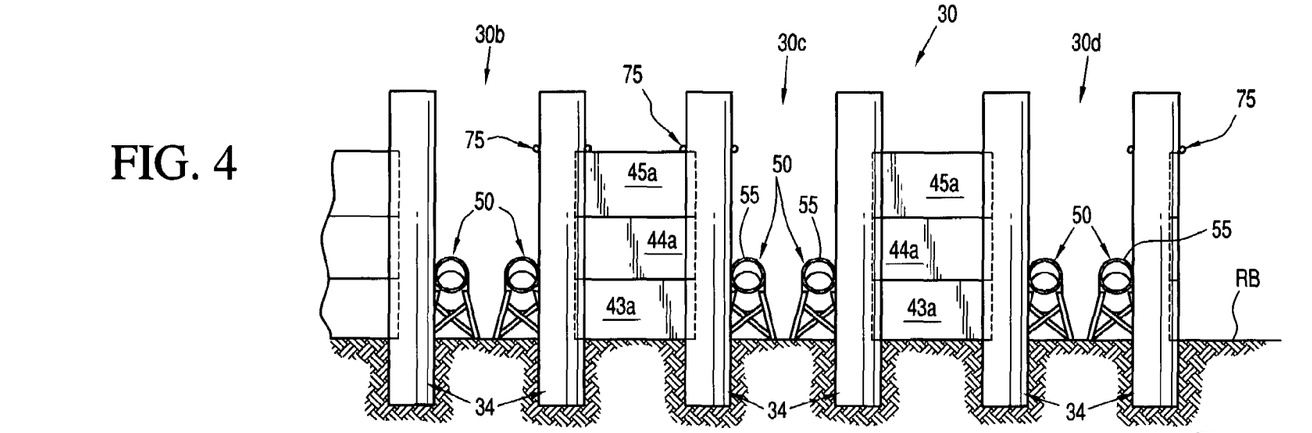
FIG. 4 is a fragmentary cross-sectional view looking upstream taken along line 4-4 of FIG. 3, and illustrates pairs of submerged turbine/generator units supported within the converging outlet ends of each compartment/channel and adjacent walls of adjacent compartments/channels at downstream posts being spanned and closed by panels.

Concrete panels 43 through 45 (FIGS. 1, 3 and 6) are consecutively lowered between the opposing vertical slots 35, 37; 37, 39 and 39, 41 of respective vertical supports 31 through 34. Similar panels 43 through 45 are lowered consecutively within the slots 36, 38; 38, 40 and 40, 41 of the respective vertical supports 31, 32, 33 and 34. Shorter panels 43a, 44a and 45a (FIGS. 3, 4 and 6) are lowered consecutively between opposing slots 42, 42 of adjacent pairs of vertical supports to close the opening between them. The lower half of panel 43a and upper half of panel 44a shall include screened openings (not shown) below lowest water elevation to balance the water pressure between tailwater, channels and triangular enclosed areas or "V"-segments 49. Screened openings must be sufficiently shallow to utilize pole/brush equipment to clean them and avoid using divers. The stacked panels 43 through 45 (FIG. 1) thereby define converging walls 46, 47 (FIG. 3) which converge from the furthest spaced pair of vertical supports 31, 31 toward the closest spaced vertical supports 34, 34 defining respective upstream or uppermost and downstream or lowermost portions of the channel compartment 30c and each of the identically constructed remaining illustrated compartments 30a, 30b and 30d. Due to the converging nature of each of the channels 30a through 30d, the roiling and churning water leaving the draft tube outlets 21 is progressively confined and constricted between the converging walls 45, 46 of the channels 30a through 30d to both accelerate the flow and convert it toward laminar flow useable to generate electricity both well below water surface level and also adjacent thereto by the respective first and second electricity generating means 50, 70, as will be described more fully hereinafter.

Figure 1:
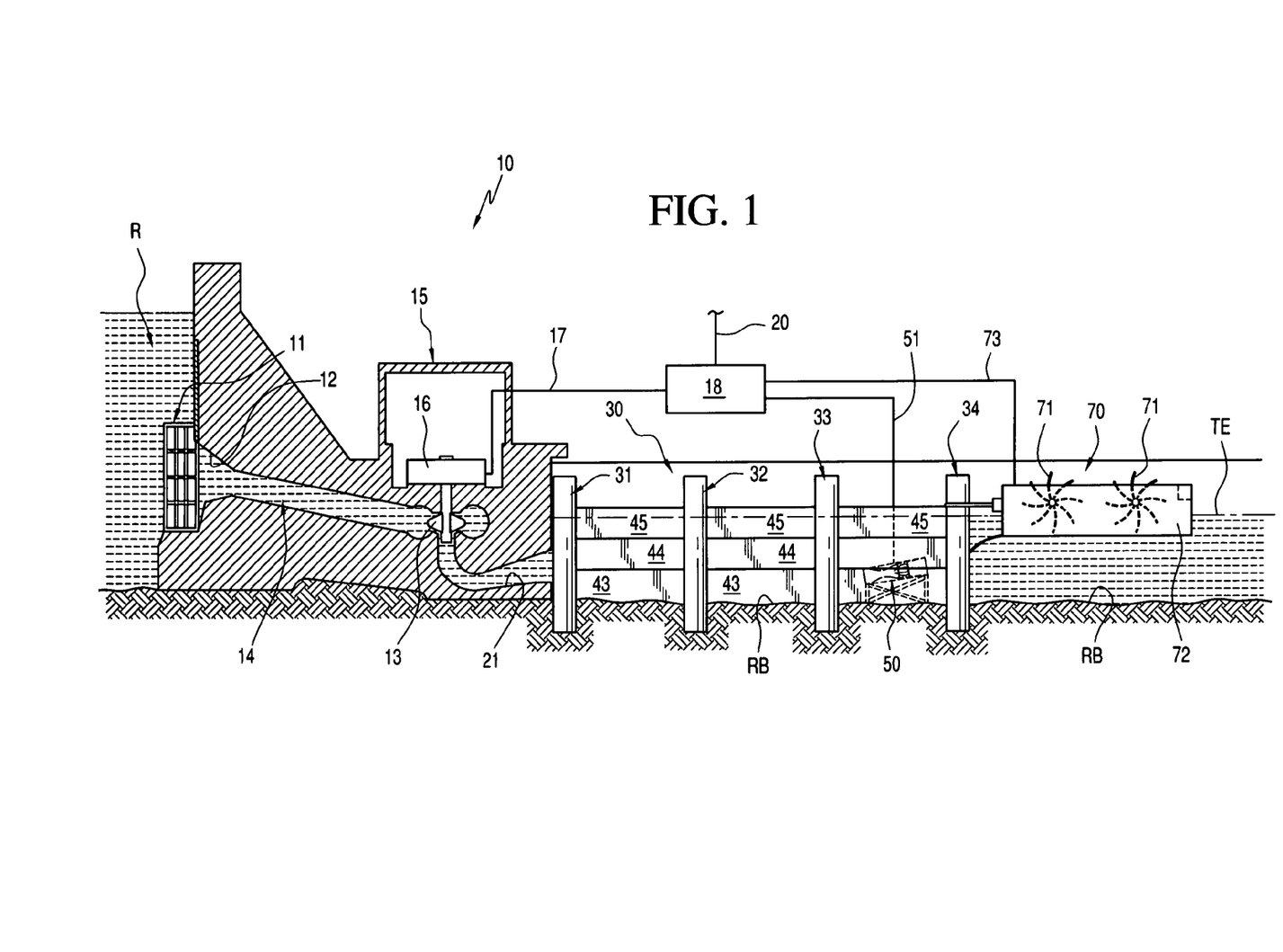
FIG. 1 is a vertical cross-section taken through a conventional hydroelectric dam and illustrates downstream of a draft tube a wall which in part defines one of several side-by-side channels which convert turbulent tailwater flow into laminar flow, a lowermost submerged turbine/generator unit which benefits from bottommost flow and downstream therefrom a barge supported electricity generating units each efficiently driven by respective river bottom and upper surface laminar flow.

However, reference is made to FIG. 1 of the drawings which illustrates electricity generating means 50 located submerged and closely adjacent a river bottom RB and substantially within the downstream end portion of the channel 30c (FIG. 3), while the second electricity generating means 70 in the form of undershot water wheels 71 carried by barges 72 are driven by the water's kinetic energy closely adjacent maximum tailwater elevation TE. Because the second electricity generating means 70 is located well above the first electricity generating means 50, any turbulence created by the latter adjacent the river bottom RB is under high tailwater depth conditions substantially ineffective to disturb the laminar flow in the upper water surface adjacent the tailwater elevation TE.

The first electricity generating means 50 are a plurality of turbine/generator units conventionally supported adjacent the river bottom RB within the downstream end portion of each of the channels 30a through 30d, particularly as illustrated with respect to the channels 30a through 30d of (FIG. 2) and 30c and 30d of (FIG. 3). Though the turbine/generator units 50 are located in pairs within the downstream-most converging portions of the channels 30a through 30d, more or less than two turbine/generator units 50 can be utilized. The turbine/generator units 50 are connected by a power line 51, (FIG. 1) to the power system 18. Preferably, each turbine/generator unit 50 is provided with means 55 (FIG. 7) for further accelerating the laminar flow incident to driving the turbine/generator unit 50. The accelerating means 55 is a substantially frusto-conical water flow acceleration tube which surrounds each turbine/generator unit 50. However, reference is made to FIG. 1 of the drawings which illustrates the first electricity generating means 50 RB located submerged and closely adjacent the river bottom RB and substantially within the downstream end portion of channel 30c (FIG. 3), and the second electricity generating means 70 which include undershot water wheels 71 carried by barges 72 driven by the water's kinetic energy closely adjacent maximum tailwater elevation TE.

Figure 5:
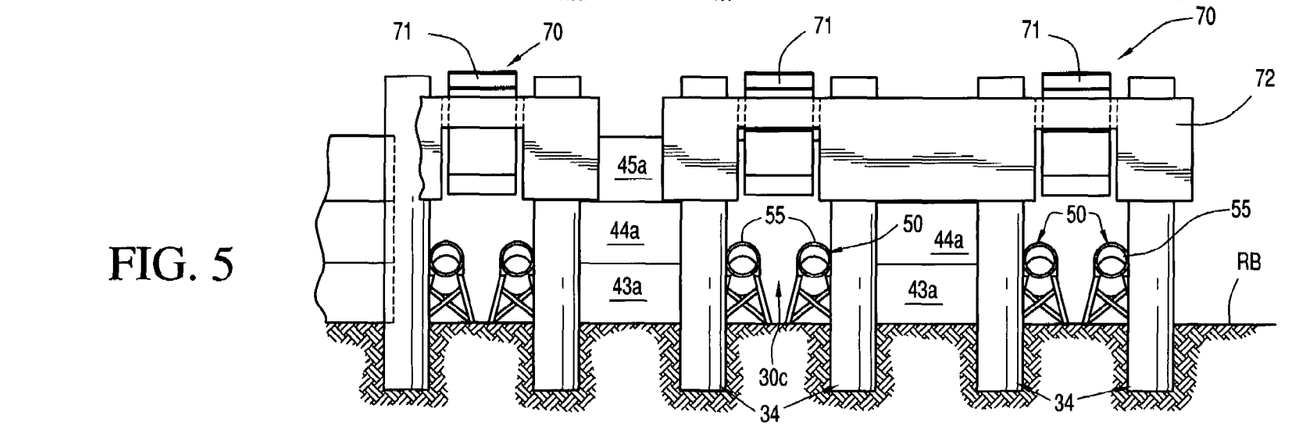
FIG. 5 is an end elevational view taken along line 5-5 of FIG. 3, and illustrates the manner in which the undershot water wheels carried by the barges which drive turbine/generators are aligned each with an associated compartment/channel to access optimum upper hydraulic surface laminar flow conditions.

Each barge 72 of the second electricity generating means 70 include buoyancy chambers (not shown) which can be utilized to locate the undershot water wheels 71 to the most efficient depth beneath the tailwater elevation TE, and electricity generated thereby is delivered by power lines 73 (FIG. 1) to the power station 18. The barges 72 are connected at opposite ends thereof by U-shaped supports 75 which slidably embrace selective ones of the vertical supports 34 and can slide vertically upwardly and downwardly relative thereto to accommodate for variations in tailwater elevation TE. The U-shaped supports 75 and particularly a pair of parallel legs 76 of each can utilize mechanical means to permit the barges 72 to be advanced toward or moved away from the vertical supports 34 depending upon upper laminar flow conditions adjacent the tailwater elevation TE. The water wheels 71 are also centered along a centerline CL (FIG. 5) bisecting the various channels 30a through 30d to achieve optimum performance. Thus, by locating the water wheels 71 well above the submerged turbines 50 coupled with the orientation thereof with respect to the center lines CL of all of the channels 30a through 30d, the upper surface location of the water wheels 71 access the surface velocity of the upper laminar flow without affecting the laminar flow of the submerged turbine units 50.

It is to be understood that the converging channels or compartments 30a through 30d, the turbine/generator units 50 and barges 72 and their associate water wheels 70 extend the entire length of the powerhouse 15 with the size and numbers thereof, as well as the length and height of the channels 30a through 30d, being dependent upon the dam 10 with which the invention can be associated. The various heights and lengths, entrance ends and discharge ends of the channels 30a through 30d and the first and second electricity generating means 50, 70, respectively, would be comparatively selected using performance factors matched to the hydraulic conditions of a specific hydroelectric dam 10. Most importantly, however, the laminar flow adjacent the river bottom RB which efficiently drives the turbine/generator units 50 does not detract from or reduce the efficiency of the water wheels 71 subjected to the laminar flow at the fastest surface velocities adjacent to the tailwater elevation TE.

Figure 8:
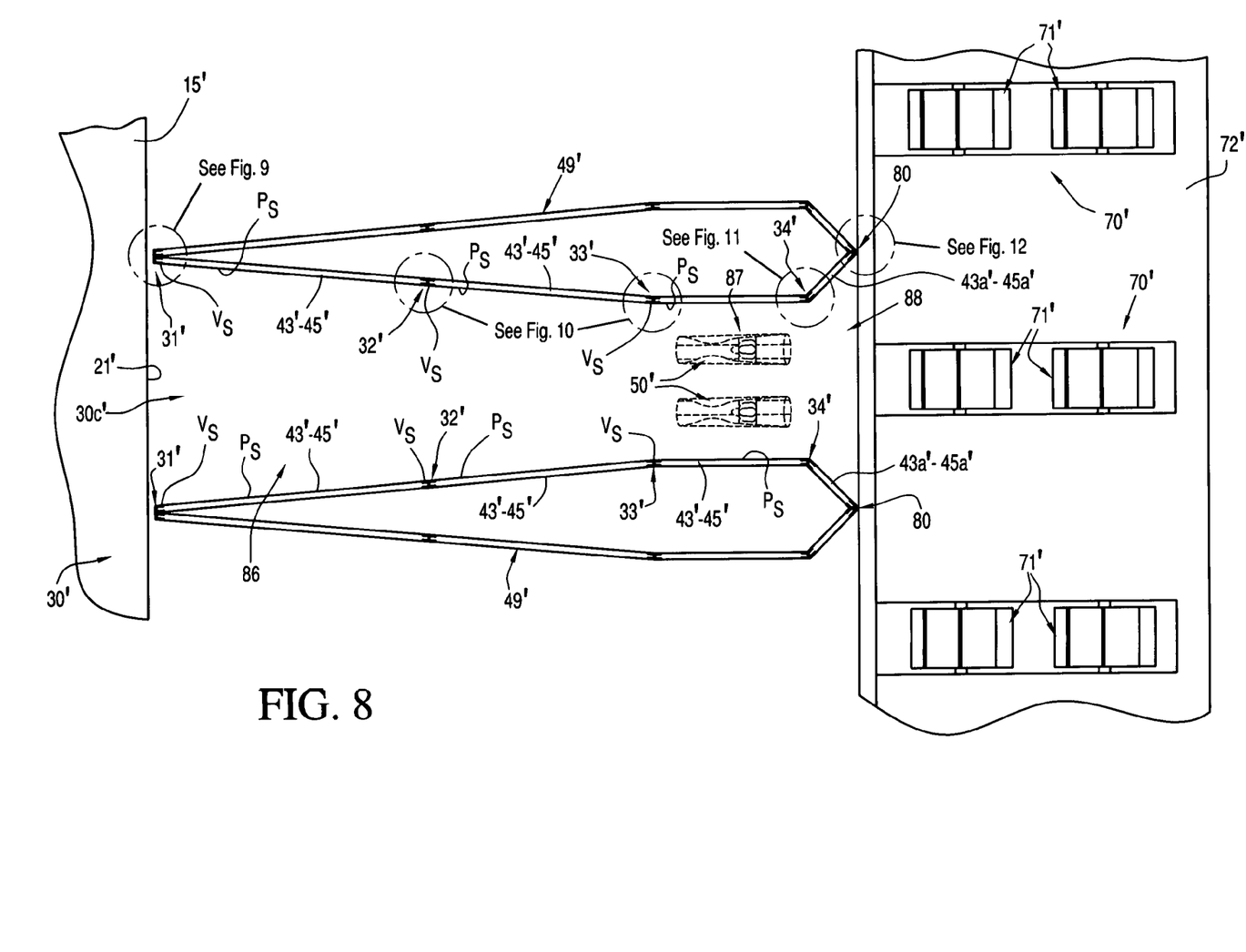
FIG. 8 is a fragmentary top plan view similar to FIG. 3, and illustrates one of several venturi compartments/venturi channels which convert turbulent tailwater flow into laminar flow, and the electricity generating turbines within a parallel channel portion of the venturi channel.

The invention as thus far described, including details in FIGS. 1 through 7, may be sufficient for many projects; however, the abrupt open exits from channels 30c, 30d (FIG. 3) produce eddies that may be counter productive for turbine/generator units 71 carried by floatable segments (not shown) supported by stable platforms 72 or other turbine/generator units (not shown) supported by or suspended under stable platforms 72 (FIG. 3). The embodiment of the invention of FIGS. 8 through 12 eliminates eddy formation concerns. Reference is first made to FIG. 8 of the drawings which includes first means 50' for generating electricity from the laminar flow at river bottom RB and second means 70' downstream from the first generating means 50' for generating further electricity from upper surface laminar flow. The first and second electricity generating means 50', 70', respectively, are identical to those heretofore described with respect to FIGS. 1 through 7 of the drawings, but the turbulent tail water flow converting means 30 of FIGS. 1 through 7 constructed as a continuously converging channel is instead constructed as a venturi channel 30' to eliminate eddies at the exits. Structure corresponding to comparable/equivalent structure heretofore described with respect to FIGS. 1 through 7 is primed, such as a venturi channel or compartment 30c' (FIG. 8) which is but one of many side-by-side venturi channels corresponding to the channels or compartments 30a through 30d located along the length of the powerhouse 15 (FIGS. 2 and 3) and 15' (FIG. 8).

Figure 9:
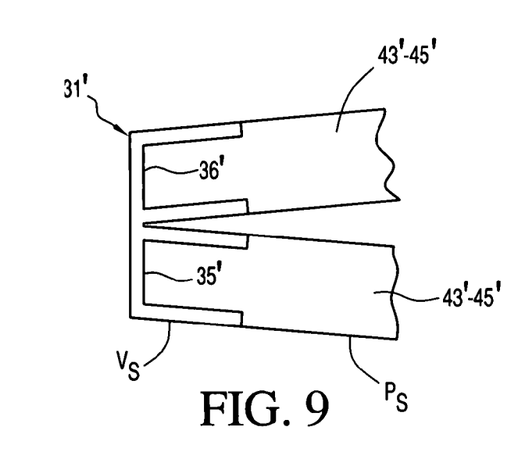
FIGS. 9 through 12 are fragmentary enlarged plan views detailing in FIG. 8 the respective encircled connections using H-piles to obtain smooth uninterrupted surfaces at sliding connections between edges of panels slid downwardly into vertical slots of associated H-piles/end supports.
Figure 10:
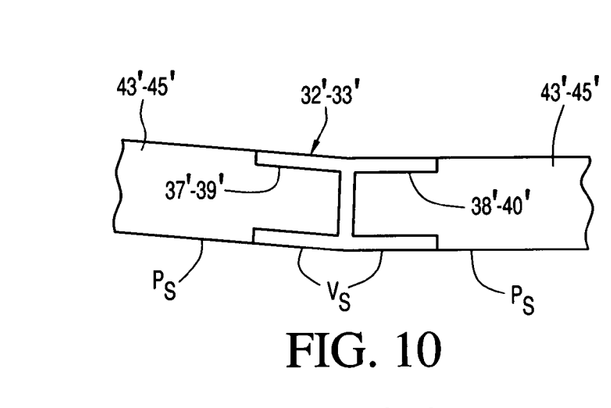
Figure 11:
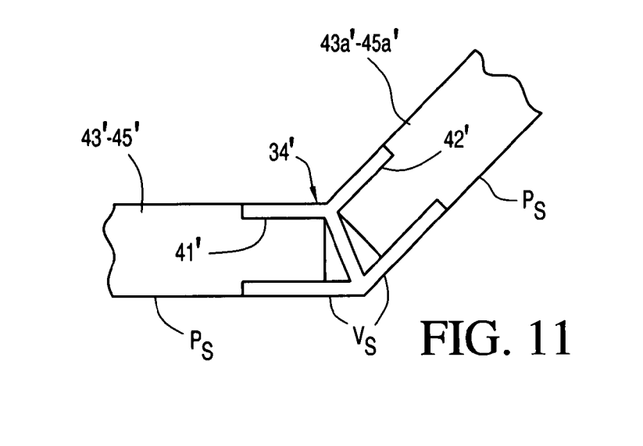
Figure 12:
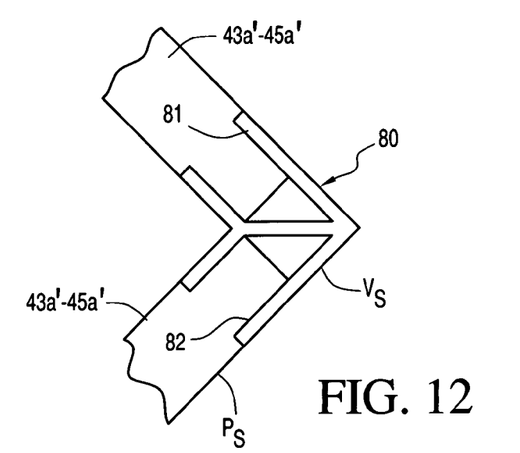

As in the case of the channel 30c, the venturi channel 30c' is formed by four pairs of vertical supports, H-piles, posts, columns or piers 31', 31' (FIGS. 8 and 9); 32', 32' and 33', 33' (FIGS. 8 and 10); 34', 34' (FIGS. 8 and 11) and 80, 80 (FIGS. 8 and 12). The upstream or uppermost pair of vertical supports 31', 31' are spaced furthest from each other, while the next two pair of vertical supports 32', 32' and 33', 33' are located closer to each other. The pairs of vertical supports 33', 33' and 34', 34' are parallel to each other and downstream thereof the pair of vertical supports 80, 80 are spaced midpoint the structure end columns 34, 34 (not shown) and downstream half that distance 80, 80 (FIG. 8).

The venturi channel 30c' further includes a plurality of concrete panels 43' through 45' corresponding to the concrete panels 43 through 45 which are consecutively lowered between the opposing vertical slots of the vertical supports 31', 32' and 32', 33' which collectively define a converging channel portion 86 of the venturi channel 30c' which transitions to a further downstream parallel channel portion 87 defined by parallel spaced panels 43'-45' supported between the pairs of H-piles 33', 34' (FIG. 8).

A divergent channel portion 88 (FIG. 8) is defined by the two pairs of panels 43a'-45a', 43a'-45a' slidingly assembled between the last two pairs of H-pile vertical supports 34', 80; 34', 80 (FIGS. 8 and 12).

It is to be particularly noted that the first electricity generating means 50' (FIG. 8) are located in the parallel laminar flow channel portion 87 of the venturi channel 30c'. Thus, in addition to the laminar flow created during water flow through the converging channel portion 86, the laminar flow velocity/kinetic energy is further augmented/increased by the venturi effect created by the venturi channel 30c' and released without eddies through a diverging exit at the divergent channel portion 88, thereby further increasing the power generating efficiencies of the first electricity generating means/turbines 50'.

As is most readily apparent between a comparison of FIGS. 3 and 8 through 12 of the drawings, the vertical supports 31 through 34 are rounded and portions thereof project into the various channels 30c, 30d, for example, which tends to create flow disturbances, such as small eddies. The latter undesired effects are substantially eliminated or reduced by the construction and assembly of the panels 43'-45' and the associated channels or vertical supports 31' through 34' and 80.

As is best illustrated in FIGS. 9 through 12 of the drawings, all of the panels 43'-45' have stepped vertical edges which when lowered downwardly in the various slots 35', 36'; 37', 39'; 38', 40'; etc., place panel surfaces Ps of the opposing panels 43'-45' in substantially the same vertical plane as inboardmost surfaces Vs of the channels with which the panels 43'-45' are connected. Since all of the surfaces Vs, Ps merge smoothly and uninterruptedly in the convergent channel portion 86 and the parallel channel portion 87 in particular, the laminar flow created thereby and flowing therein is not adversely affected by flow variations, as described heretofore, caused by the rounded vertical supports 31, 32; 32, 33; etc., of the channels 30a through 30d. In this manner, the substantially seamless coextensive surfaces Vs, Ps in the convergent channel portion 86 and the parallel channel portion 87 of the venturi channel 30c' and like side-by-side arranged venturi channels optimize the electricity generated by the turbines 50'.

Although a preferred embodiment of the invention has been specifically illustrated and described herein, it is to be understood that variations may be made in the apparatus without departing from the spirit and scope of the invention, as defined by the appended claims.

For example, in keeping with the invention designers and contractors will apply new insight and innovations to tailor the invention to site specific parameters with the objective to produce a facility that generates maximum electricity from existing tailwater flows. The solution must not diminish existing electricity production unless the new addition generates sufficient additional power to make up the difference with a profitable return on investment.

It should be noted walls may be formed several ways including casting the "V" segments (49, FIGS. 3 and 49', FIG. 8) as complete reinforced concrete monolithic units that are set in place and connected in sequence.

Figures 6, 7:
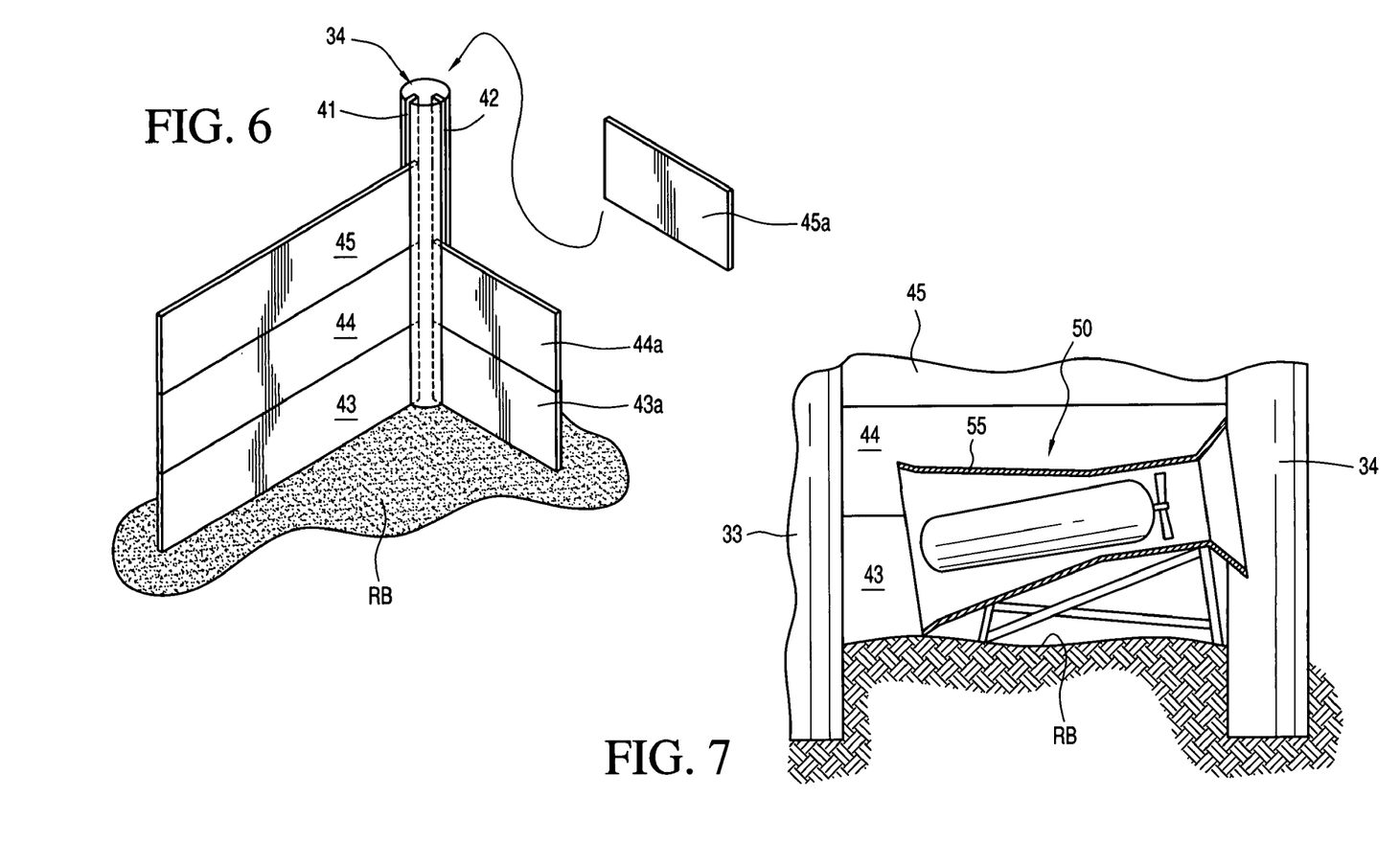
FIG. 6 is a perspective view, and illustrates the manner in which panels are lowered into vertical slots of supports, columns, piers or posts to form adjacent side-by-side compartment/channels converging in a downstream direction toward the submerged and buoyantly supported electricity generating units.
FIG. 7 is an enlarged fragmentary side elevational view partially in cross section and illustrates a frusto-conical water flow acceleration tube surrounding a submerged self-supported turbine/generator unit to increase laminar flow velocity incident to driving the turbine.

Converging walls 45, 46 of channels 30a through 30d are smooth but the river bottom RB is not (FIGS. 1, 6, 7). Surface irregularities beyond a point will diminish efforts to generate laminar flow and must be eliminated. This is especially true within the downstream reach containing submerged turbine/generators 50 (FIGS. 2, 3) and within the parallel walled venturi channel 87 (FIG. 8).

Drill barges with spuds or similar structures with permanent pile supports become stable platforms well above high water elevation and wave effects that contain and control rectangular floatable segments for turbines/generators. Each rectangular segment moves vertically by floatation with water elevation and horizontally by controls to and fro along channel centerlines CL. Platforms connect to downstream pilings (FIG. 8) to maintain relationship of floatable segments with channels. Platforms can be intermittent (FIG. 2) spanning two or more channels or continuous (FIG. 8) like a pier for access from shore for construction and future operations and maintenance. In either case they run full length of the powerhouse 15 and its draft tube outlets 21. Platforms are positioned to ensure floatable sections directly face and match narrowest widths of downstream channel openings so floatable turbine/generator units can extend into the openings and utilize most favorable flow conditions and when necessary retract to allow access to submerged units. Special variations are required for floatable units 71 (FIGS. 1, 3, 5 and 8) such as horn intakes for individual rectangular channels enclosed on sides and bottom.

Stable platforms containing floatable segments with turbine/generators may serve as cover for smolt against aerial or other predators as smolt reorient themselves from passage through turbines.

Multiple submerged turbine/generator units 50, 50' may occupy each lower channel outlet area depending upon type, size, spacing, support structures and hydraulic impacts on uppermost laminar flows which floatable turbine/generator units 79 (FIGS. 1 and 3) rely on. Numbers of floatable turbine/generator units 70 also rely upon type, size, spacing and hydraulic impacts on each other. Submersible turbine/generator units 50, 50' consume laminar flow and could impact uppermost flows. Therefore, relative usage of submerged and floatable turbine/generator units must be juggled to achieve highest efficiencies of electricity generation for both types.

What is claimed is:

1. In a dam for generating hydroelectric power that utilizes water head through at least one gate-controlled intake to a penstock to drive a primary turbine that in turn drives a generator then past the primary turbine exits through at least one draft tube that discharges the water into an afterbay, the improvement comprising means for converting turbulent tailwater flow exiting the at least one downstream draft tube into laminar flow, first means for generating electricity from a lowermost portion of the laminar flow, and second means downstream from the first generating means for generating further electricity from an uppermost surface portion of the laminar flow.

2. The dam as defined in claim 1 wherein said turbulent tailwater flow converting means is a channel converging in a flow direction toward said first electricity generating means.

3. The dam as defined in claim 1 wherein said turbulent tailwater flow converting means is a channel converging in a flow direction toward said second electricity generating means.

4. The dam as defined in claim 1 including means for buoyantly supporting said second electricity generating means.

5. The dam as defined in claim 1 including means for buoyantly supporting said second electricity generating means above said first electricity generating means.

6. The dam as defined in claim 1 including means for buoyantly supporting said second electricity generating means above said first electricity generating means and downstream therefrom.

7. The dam as defined in claim 1 wherein said turbulent tailwater flow converting means is a channel, and said channel is defined at least in part by a pair of adjacent walls converging toward said first electricity generating means.

8. The dam as defined in claim 1 wherein said turbulent tailwater flow converting means is a channel converging from an uppermost channel portion in a flow direction toward a downstream channel portion, said first electricity generating means being a turbine positioned within and adjacent said downstream channel portion and being driven by the laminar water flow, and means for accelerating the laminar water flow incident to driving said turbine.

9. The dam as defined in claim 1 wherein said turbulent tailwater flow converting means is a channel converging from an upstream channel portion in a flow direction toward a downstream channel portion, said first electricity generating means being a turbine positioned adjacent said downstream channel portion and being driven by the laminar water flow, means for accelerating the laminar water flow incident to driving said turbine, and said accelerating means is a substantially frusto-conical water flow acceleration tube constructed and arranged to increase laminar flow velocity by venturi effect incident to driving said turbine to thereby increase the efficiency thereof.

10. The dam as defined in claim 1 wherein said turbulent tailwater flow converting means is a channel converging from an uppermost channel portion in a flow direction toward a downstream channel portion, said first electricity generating means being a turbine positioned within and adjacent said downstream channel portion and being driven by the laminar water flow, means for accelerating the laminar water flow incident to driving said turbine, said accelerating means is a substantially frusto-conical water flow acceleration tube constructed and arranged to increase laminar water flow velocity by venturi effect incident to driving said turbine to thereby increase the efficiency thereof, and said frusto-conical water flow acceleration tube is disposed in substantially external surrounding relationship to said turbine.

11. The dam as defined in claim 1 wherein said turbulent tailwater flow converting means, first electricity generating means and second electricity generating means are disposed in substantially linearly aligned consecutive relationship in the direction of tailwater/laminar water flow.

12. The dam as defined in claim 1 wherein said turbulent tailwater flow converting means is a channel, said channel is defined at least in part by a pair of adjacent walls converging toward said first electricity generating means, at least two pair of vertical supports, a first upstream pair of said supports being spaced a greater distance from each other than a second downstream pair of said supports, means for connecting a first of said pair of walls between a first and second support of said respective first upstream and second downstream pair of supports, and means for connecting a second of said pair of walls between another first and another second support of said respective first upstream and second downstream pair of supports.

13. The dam as defined in claim 1 wherein said turbulent tailwater flow converting means is a channel, said channel is defined at least in part by a pair of adjacent walls converging toward said first electricity generating means, at least two pair of vertical supports, a first upstream pair of said supports being spaced a greater distance from each other than a second downstream pair of said supports, means for slidably connecting a first of said pair of walls between a first and second support of said respective first upstream and second downstream pair of supports, and means for slidably connecting a second of said pair of walls between another first and another second support of said respective first upstream and second downstream pair of supports.

14. The dam as defined in claim 3 including means for buoyantly supporting said second electricity generating means.

15. The dam as defined in claim 3 wherein said turbulent tailwater flow converting means is a channel, and said channel is defined at least in part by a pair of adjacent walls converging toward said first electricity generating means.

16. The dam as defined in claim 3 wherein said turbulent tailwater flow converting means is a channel converging from an uppermost channel portion in a flow direction toward a downstream channel portion, said first electricity generating means being a turbine positioned with and adjacent said downstream channel portion and being driven by the laminar water flow, and means for accelerating the laminar water flow incident to driving said turbine.

17. The dam as defined in claim 3 wherein said turbulent tailwater flow converting means is a channel converging from an upstream channel portion in a flow direction toward a downstream channel portion, said first electricity generating means being a turbine positioned adjacent said downstream channel portion and being driven by the laminar water flow, means for accelerating the laminar water flow incident to driving said turbine, and said accelerating means is a substantially frusto-conical water flow acceleration tube constructed and arranged to increase laminar water flow velocity by venturi effect incident to driving said turbine to thereby increase the efficiency thereof.

18. The dam as defined in claim 12 including means for buoyantly supporting said second electricity generating means.

19. The dam as defined in claim 12 wherein said turbulent tailwater flow converting means, first electricity generating means and second electricity generating means are disposed in substantially linearly aligned consecutive relationship in the direction of tailwater/laminar water flow.

20. The dam as defined in claim 12 including means for buoyantly supporting said second electrically generating means above said first electricity generating means and downstream therefrom.

21. In a dam for generating hydroelectric power that utilizes water head through at least one gate-controlled intake to a penstock to drive a primary turbine that in turn drives a generator then past the primary turbine exits through at least one draft tube that discharges the water into an afterbay, the improvement comprising means for converting turbulent tailwater flow exiting the at least one downstream draft tube into laminar flow, said turbulent tailwater flow converging means being a venturi channel defined by an upstream channel portion converging in the direction of the tailwater flow from the at least one draft tube with a medial parallel channel portion which opens into a downstream diverging channel portion; first means in said medial parallel channel portion for generating electricity from a lowermost portion of the laminar flow, and second means adjacent the diverging channel portion for generating further electricity from an uppermost surface portion of the laminar flow.

22. The dam as defined in claim 21 wherein said first electricity generating means and said second electricity generating means are disposed in substantially linearly aligned relationship in the direction of tailwater/laminar water flow.

23. The dam as defined in claim 21 including means for buoyantly supporting said second electricity generating means.

24. The dam as defined in claim 21 including means for buoyantly supporting said second electricity generating means above said first electricity generating means and downstream therefrom.

25. The dam as defined in claim 21 wherein said first electricity generating means is a turbine and means for further accelerating the laminar flow within said medial parallel channel portion incident to driving said turbine.

26. The dam as defined in claim 25 wherein said accelerating means is a substantially frusto-conical water flow acceleration tube constructed and arranged to increase laminar water flow velocity by venturi effect incident to driving said turbine to thereby increase the efficiency thereof, and said frusto-conical water flow acceleration tube is disposed in substantially external surrounding relationship to said turbine.

\* \* \* \* \*